United States Patent [19]
Mears

[11] Patent Number: 4,800,835
[45] Date of Patent: Jan. 31, 1989

[54] LOCATOR DEVICE

[75] Inventor: Arthur W. Mears, Loveland, Colo.

[73] Assignee: Radarfind, Inc., Broomfield, Colo.

[21] Appl. No.: 166,523

[22] Filed: Mar. 10, 1988

[51] Int. Cl.$^4$ ............... B64B 1/44; B64B 1/50; B64C 31/06

[52] U.S. Cl. ............... 116/210; 116/DIG. 9; 222/5; 244/33; 244/155 A; 441/93; 441/94

[58] Field of Search ............... 116/DIG. 8, DIG. 9, 116/209, 210; 206/573, 803; 343/706; 244/31, 33, 155 R, 155 A, 153 R; 441/92-94; 222/5; 141/17, 114, 19; 40/214, 215

[56] References Cited

U.S. PATENT DOCUMENTS

| | | | |
|---|---|---|---|
| 2,570,549 | 10/1951 | Hansell | 116/DIG. 9 |
| 3,032,788 | 5/1962 | Lowther, Jr. | 441/93 |
| 3,395,877 | 8/1968 | MacFadden et al. | 116/210 |
| 3,727,229 | 4/1973 | Clinger et al. | 343/706 |
| 3,815,783 | 6/1974 | Hirata | 222/5 |
| 4,048,565 | 9/1977 | Rice, Sr. | 244/33 |
| 4,533,099 | 8/1985 | Stewart | 244/153 R |

FOREIGN PATENT DOCUMENTS

| | | | |
|---|---|---|---|
| 724937 | 1/1966 | Canada | 116/210 |
| 2415040 | 9/1979 | France | 244/33 |
| 2473200 | 7/1981 | France | 116/210 |
| 1530000 | 10/1978 | United Kingdom | 116/210 |

Primary Examiner—William A. Cuchlinski, Jr.
Assistant Examiner—W. Morris Worth
Attorney, Agent, or Firm—H. Kenneth Johnston, II

[57] ABSTRACT

A device for providing location data for use by a lost child or adult or an individual in need of assistance. The device is in the form of a small compact unit including a container having a top case and a bottom case containing a deflated airfoil and a gas cylinder containing lighter-than-air gas such as helium. A release key which when pulled allows the top case to separate from the bottom case and automatic inflation of the airfoil commences. The plunger strikes a lever driving a puncture pin into the gas cylinder filling the airfoil through a one way valve. The airfoil is tethered at one end by a line and is attached to the bottom case and maintains flight even in adverse weather conditions.

9 Claims, 4 Drawing Sheets

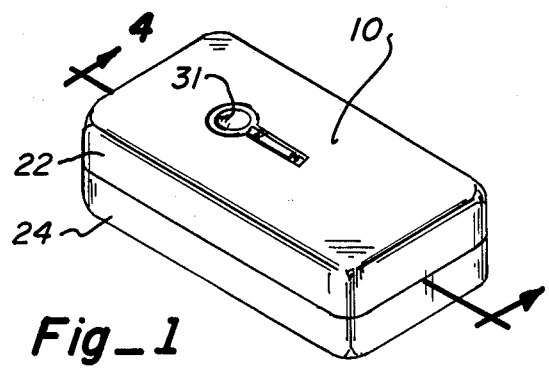
Fig_1
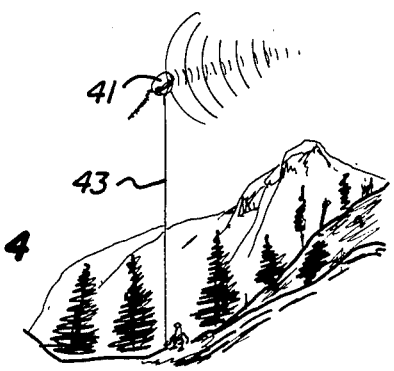
Fig_3A
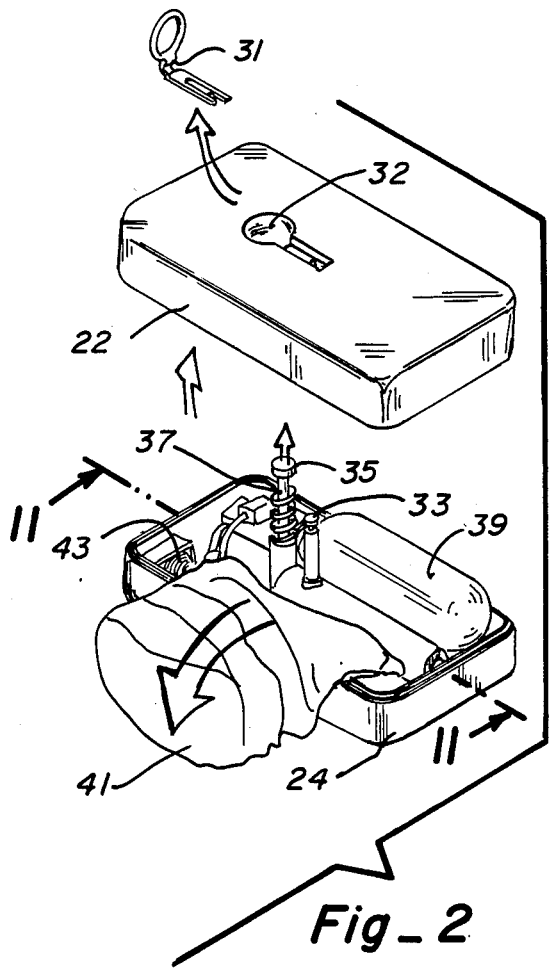
Fig_2
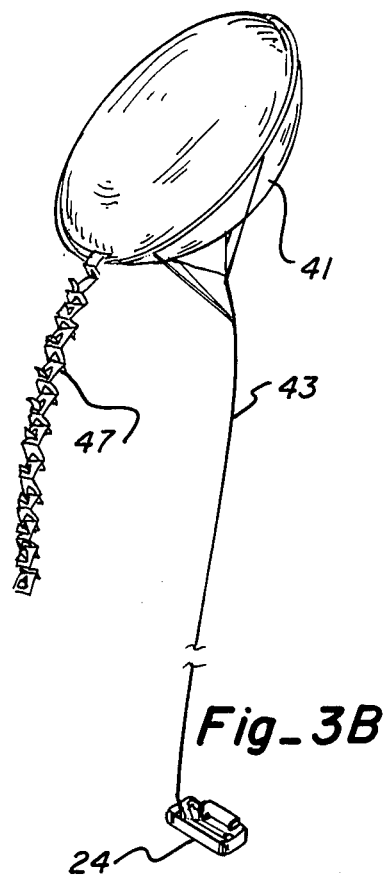
Fig_3B

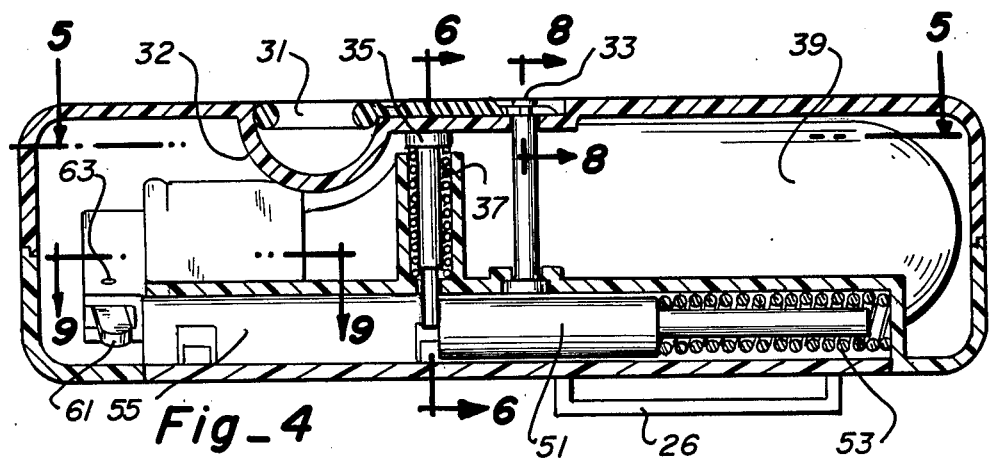
Fig_4
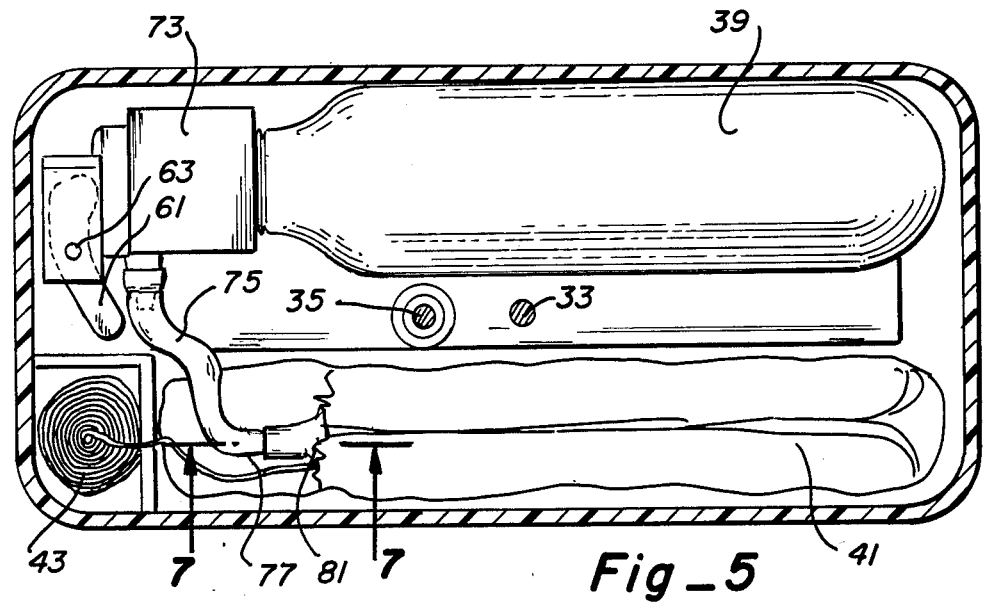
Fig_5
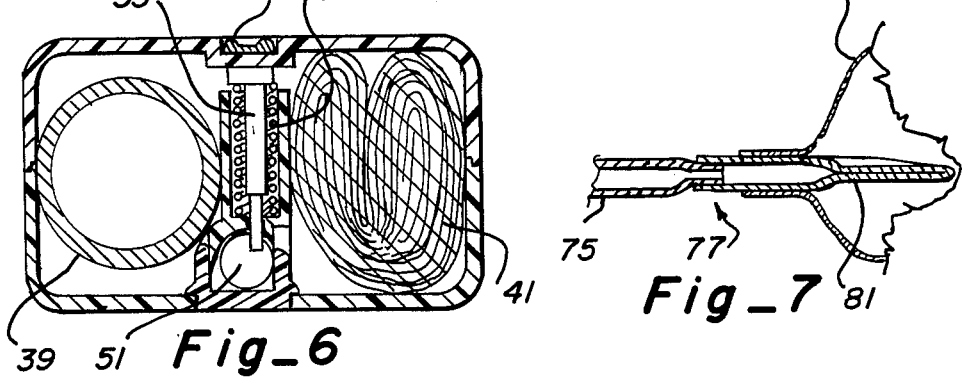
Fig_6
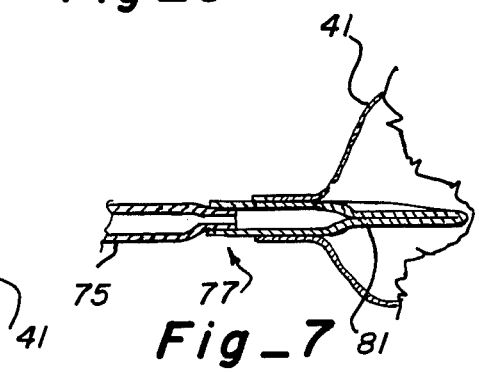
Fig_7

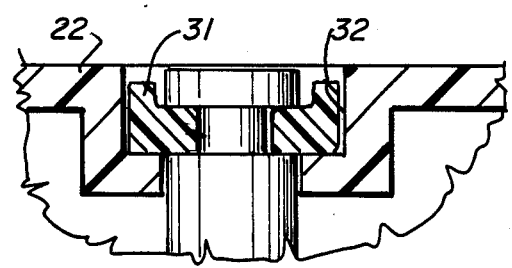
Fig_8
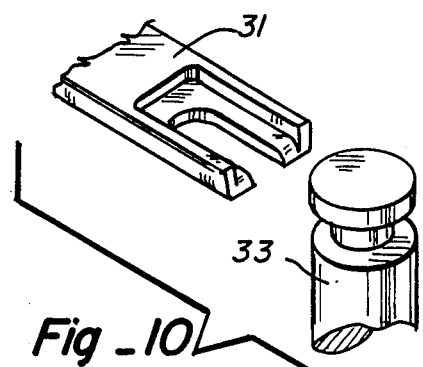
Fig_10
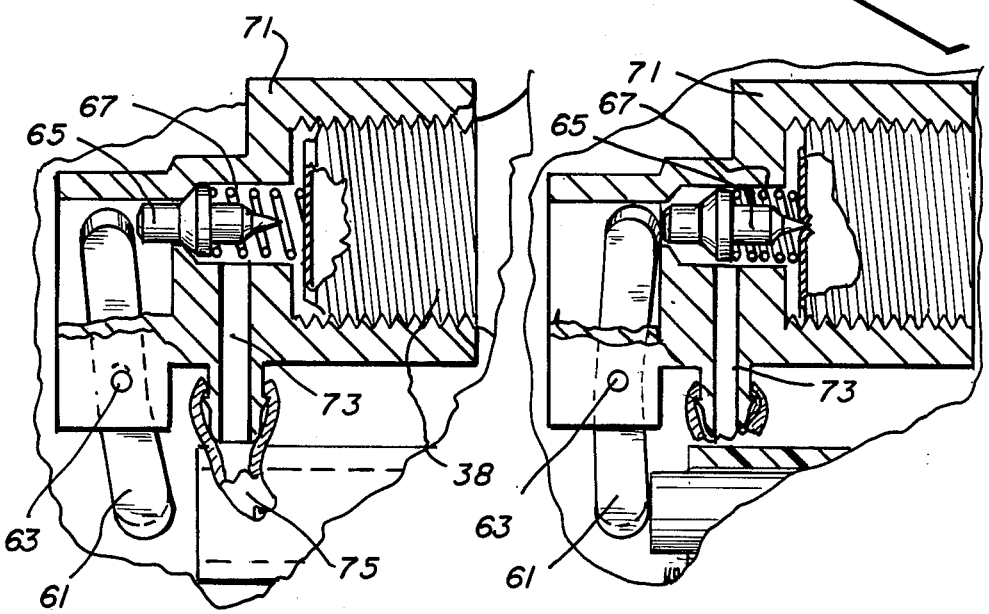
Fig_9    Fig_9A
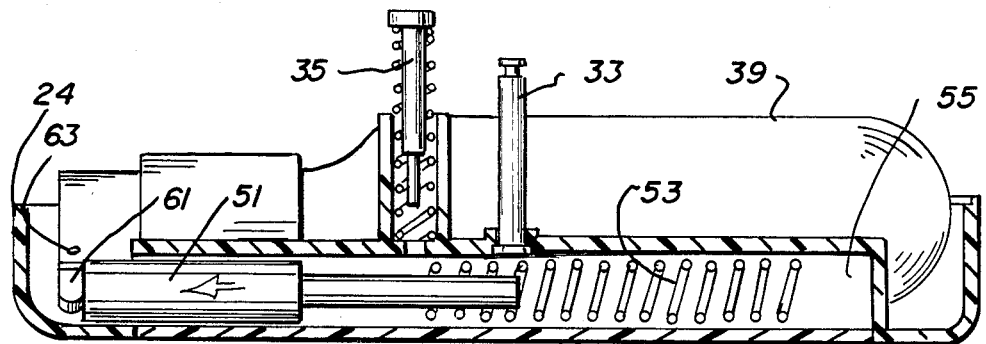
Fig_11

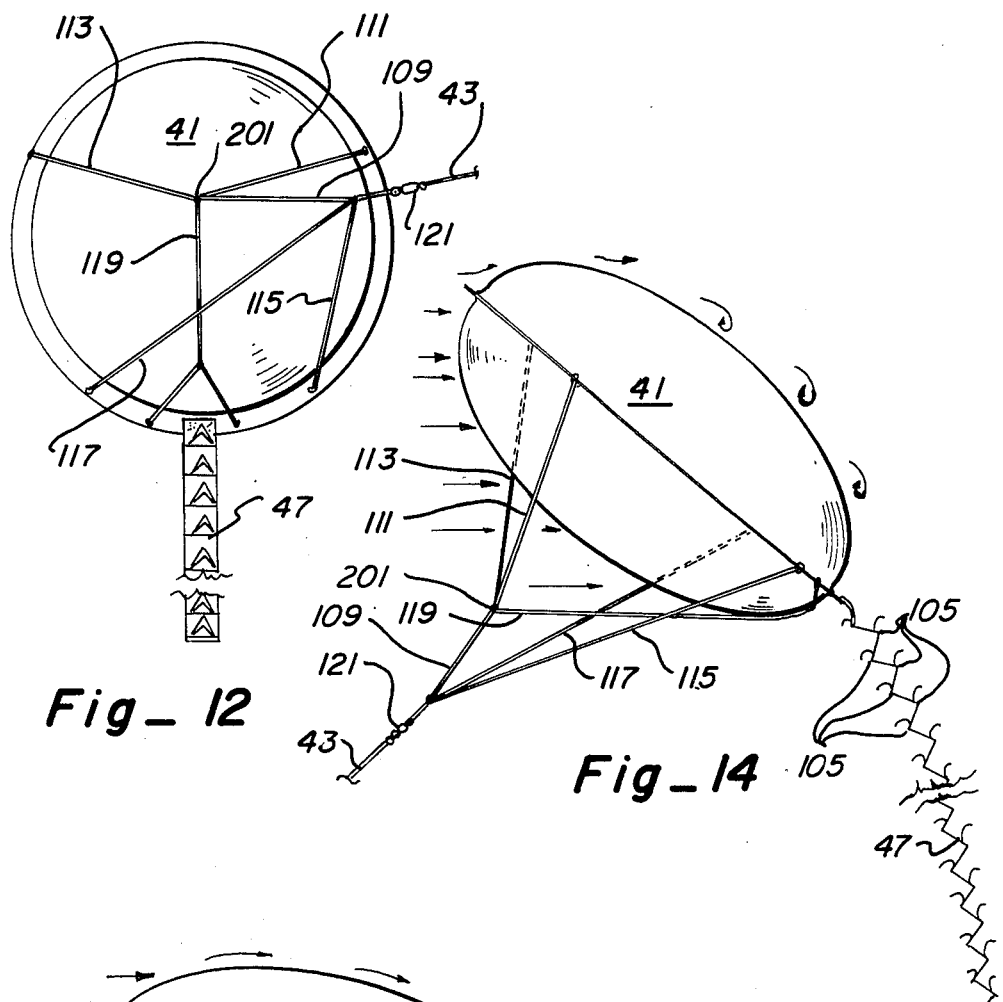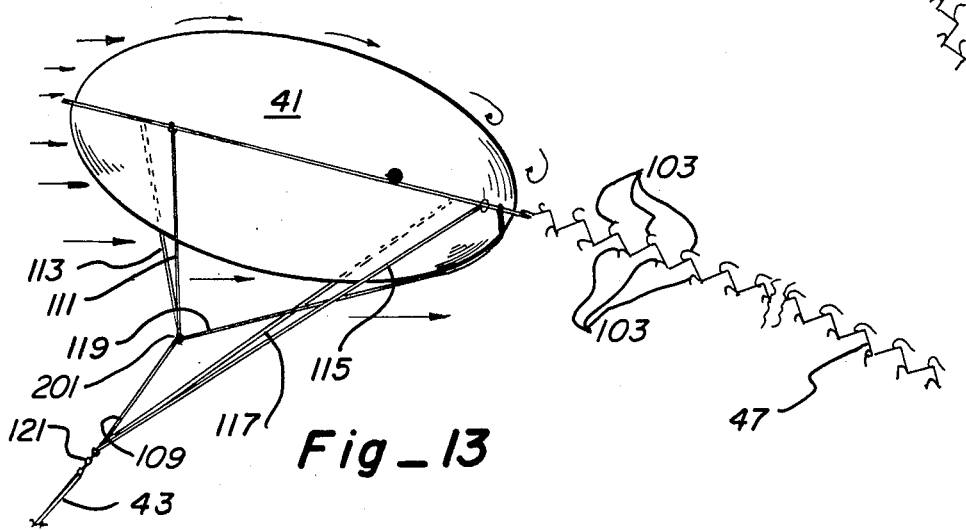

LOCATOR DEVICE

OBJECTIVES OF THE INVENTION

A broad objective of the invention is to provide a novel locator device including a deflated airfoil and a gas cylinder of compressed lighter-than-air gas for inflating the airfoil enabling the airfoil to rise and be both observed visually from a large distance and detected by microwave. The device can be used by lost children or adults or individuals in need of assistance. Another objective of the invention is to provide a compact package of the foregoing which is light weight and simple enough to use even by a small child and is easily carried on an individual's belt. It is further an object of invention to facilitate an individual who may be injured so that the device automatically inflates upon pulling the release key.

Another objective of the invention is to provide an airfoil which will remain aloft during high wind or adverse weather conditions.

Still another objective of the invention is to provide a unit that is extremely simple in design and construction, and sufficiently inexpensive so that the device may be dicarded after use.

BACKGROUND OF THE INVENTION

There are numerous devices which are designed to inflate a balloon and provide location information of the individual. Most all of the devices are cumbersome or are not simple to operate by a child. Porter, U.S. Pat. No. 4,295,438 requires an individual to be sufficiently strong to force the gas cylinder down against the needle tube puncturing the gas cylinder and inflating the balloon. Further, an incapacitated person would not easily be able to operate the device.

McNeill, U.S. Pat. No. 3,941,079 discloses a balloon which is reusable, rugged and has relative long life. It is obviously not a device which could be carried about by a child nor easily operated by a child or an incapacitated person.

All of the inflatable devices including those already cited, Chetlan, U.S. Pat. No. 2,646,019; Crofford, U.S. Pat. No. 827,350; Paulson, U.S. Pat. No. 1,836,495; Leslie, U.S. Pat. No. 2,395,006; Hansen U.S. Pat. No. 2,629,115; Samwald, U.S. Pat. No. 2,842,090; Walker, U.S. Pat. No. 2,862,531; Hanson, U.S. Pat. No. 3,154,050; Pritchard, U.S. Pat. No. 3,187,712; Rozzella, U.S. Pat. No. 3,381,655; Clinger U.S. Pat. No. 3,727,229; Lutz, U.S. Pat. No. 3,735,723; and Collins, U.S. Pat. No. 3,796,181 cannot withstand any wind without being driven to the ground. MacFadden, U.S. Pat. No. 3,395,877 recognizes the problem with adverse flight conditions and discloses an air duct as a stabilizer on the tail portion of an inflatable device however does not provide the benefits of the within device.

Other characteristics, advantages and objectives of this invention can be more readily appreciated from the following description and appended claims. When taken in conjunction with the accompanying drawings, this description forms a part of the specification wherein like reference and characters designate corresponding parts in several views.

DESCRIPTION OF THE DRAWINGS

Referring more particularly to the accompanying drawings, which are for illustrative purposes only:

FIG. 1 is a perspective view of the locator device.

FIG. 2 is a perspective view of the opened locator device.

FIG. 3 is a perspective view of the airfoil in the inflated state.

FIG. 3-A is a perspective view of the locator device in operation in the environment.

FIG. 4 is a cross-sectional view of FIG. 1 taken along the line 4—4.

FIG. 5 is a cross-sectional view of FIG. 4 taken along the line 5—5.

FIG. 6 is a cross-sectional view of FIG. 4 taken along the line 6—6.

FIG. 7 is a cross-sectional view of FIG. 5 taken along the line 7—7.

FIG. 8 is a cross-sectional view of FIG. 4 taken along the line 8—8.

FIG. 9 is an enlarged cross-sectional view of FIG. 4 taken along the line 9—9.

FIG. 9-A is an enlarged cross-sectional view of FIG. 4 taken along the line 9—9 with the gas cylinder punctured.

FIG. 10 is an enlarged cross-sectional view of the release key and release pin.

FIG. 11 is a cross-sectional view of FIG. 2 taken along the line 11—11.

FIG. 12 is bottom perspective of the airfoil and tether system in the inflated state.

FIG. 13 is a perspective view of the airfoil and tether system in the inflated state in a low wind condition.

FIG. 14 is a perspective view of the airfoil and tether system in the inflated state in a strong wind condition.

DESCRIPTION OF THE PREFERRED EMBODIMENT

Referring more particularly to the drawings, there is shown a locator device 10 in FIG. 1. As illustrated in FIG. 2, there is a top case 22 and a bottom case 24. Bottom case 24 being adapted with a carrying means shown as a belt loop 26 as drawn in FIG. 4 and FIG. 11. For illustrative purposes, the top case 22 and bottom case 24 are held together by release key 31 and release pin 33 within key recess 32 as shown in FIG. 4 and FIG. 8 in order to avoid inadvertent activation of locator device 10 by being snagged on foreign objects while walking about the environment.

In operation release key 31 is removed from release pin 33 as shown in FIG. 2 and FIG. 10. Top case 22 is separated from bottom case 24 by pressure excerted by plunger restraint 35 against top case 22. Spring 37 has sufficient tension to both retract plunger restraint 35 from plunger 51 and force top case 22 to separate and allowing the locator device 10 to deploy.

Once plunger retraint 35 is extracted from plunger 51, the tension of plunger spring 53 drives plunger 51 in plunger channel 55 against one end of lever 61 as shown in FIG. 11. The other end of lever 61 is forced against puncture pin 65 because of the restraint action and fulcrum point of fulcrum pin 63 as shown in FIG. 9.

Puncture pin 65 has a sharp point at one end and a seat means at the other. The sharp point of puncture pin 65 pierces compressed gas cylinder 39 allowing the lighter-than-air gas to be released into gas release chamber 73 as shown in FIG. 9-A. Spring 67 extracts puncture pin 65 from compress gas cylinder 39 and seats puncture pin 65 in the gas release chamber 73 preventing the loss of the lighter-than-air gas to the environment allowing the lighter-than-air gas to pass into transfer tube 75 as shown in FIG. 9. The lighter-than-air gas passes through gas transfer tube 75 into airfoil 41 by way of one way valve 81 as shown in FIG. 5 and FIG. 7.

Gas release chamber 73 is adapted to receive and secure a compressed gas cylinder 39 having a threaded neck 38 as shown in FIG. 9 and FIG. 9-A.

Tether line 43 is attached at one end to bottom case 24 and the other end is attached to swivel 121. The outer end of tether line 43 is attached to bottom case 24 and the inner end of tether line 43 is attached to swivel 121 so that upon inflation of air foil 41, tether line 43 unwinds from the center preventing tangling or snagging. When air-foil 41 has filled with the lighter-than-air gas from compressed gas cylinder 39, the lift generated by filled airfoil 41 separates the one way valve 81 from the gas transfer tube 75 at fill connect 77 as shown in FIG. 5 and FIG. 7, and the airfoil 41 rises to a height dependant on the length of tether line 43.

One end of right forward tether line 113 and left forward tether line 111 are attached to airfoil 41 in the forward quarter of airfoil 41 by ordinary fastening means and are attached at the other end to tether line extension 109 and provide forward stability of airfoil 41 as shown in FIG. 12. One end of left rear tether line 115 and one end of right rear tether line 117 are attached to the rear quarter of airfoil 41 by ordinary fastening means and the other end of left rear tether line 115 and right rear tether line 117 is attached to tether line extension 109 as shown in FIG. 12. Both left rear tether line 115 and right rear tether line 117 are of elastic material and expand or stretch to correct for various wind conditions as shown FIG. 13 and FIG. 14. Center tether line 119 is attached at one end to tether line extension 109 and the other end of center tether line 119 is attached to the center of the rear of airfoil 41 by ordinary fastening means as shown in FIG. 12. Center tether line 119 is also of elastic material providing wind correction along with right rear tether line 117 and left rear tether line 115 as shown in FIG. 13 and FIG. 14. During high wind conditions left rear tether line 115, right rear tether line 117 and center tether line are stretched maintaining the airfoil 41 in a positive dynamic flight state as shown in FIG. 13.

Left forward tether line 111 and right forward tether line 113 are affixed to tether line extension 109 at tie point 201 in a manner that places tie point 201 forward of the center of airfoil 41. By having tie point 201 forward of center of airfoil 41, airfoil 41 is aerodynamically stable and flies.

Airfoil 41 has a tail 47, as shown in FIG. 3B, FIG. 12, FIG. 13 and FIG. 14, attached at the center of the rear of airfoil 41. Tail 47 folds at hinge portion 105 while in the locator device 10 being very compact. In operation, tail 47 expands by unfolding at hinge 105 and popout 103 extends opposite the fold angle causing the tail 47 to form a streamer as shown in FIG. 3B, FIG. 13, and FIG. 14. Tail 47 is a metalized polymer easily detected by microwave.

Airfoil 41 may be of a metalized polymer material which would be detectable by microwave or may have a metalized tail 47, as shown in FIG. 3, being 6 feet in length.

Airfoil 41 may be made of readily visible material such as florescent orange for use of locating the person using the locating device 10.

The invention and its attendant advantages will be understood from the foregoing description; and it will be apparent that various changes may be made in the form, construction and arrangement of the parts of the invention without departing from the spirit and scope thereof, or sacrificing its material advantages, the arrangments hereinbefore described being merely by way of example; and I do not wish to be restricted to the specific forms or uses mentioned, except as defined in the accompanying claims.

What is claimed is:

1. A locator device comprising;

a container;

said container having a top case and a bottom case;

said top case is mechanically affixed to said bottom case by a release key attached to said bottom case by way of a release pin which is attached to said bottom case;

a deflated and collapsed airfoil and a tail means in said container and having a fill connect with a one-way valve therein;

a cartridge of compressed gas rigidly fixed in said container to a gas release chamber;

said gas release chamber communicating with said fill connect;

said gas release chamber having a puncture pin means and a spring means for puncturing said cartridge of compressed gas and simultaneously retracting said puncture pin means allowing the compressed gas to flow through said gas release chamber into said airfoil by way of said fill connect and said one-way valve;

a plunger restraint, said plunger restraint restraining a plunger in a plunger channel;

said plunger restraint under tension of a spring and held in place by said top case;

said plunger under tension by a plunger spring for driving said plunger against a lever;

said lever affixed in said bottom case wherein said lever is held pivitally in place by a fulcrum pin;

one end of said lever located in a position to communicate with said puncture pin and the other end capable of communicating with said plunger;

a tether means connecting said bottom case and said airfoil allowing said airfoil to rise to a height the length of said tether means;

whereby said release key is pulled causing said plunger restraint to force said top case from communication with said bottom case and simultaneously allowing said plunger to be released striking said lever causing said puncture pin to puncture said cartridge of compressed gas and releasing the compressed gas and filling said airfoil allowing it to separate from said fill connect and rising to a length of said tether means.

2. A locator device according to claim 1 wherein, the bottom case has a loop means for attaching said container to a belt for ease of carrying.

3. A locator device according to claim 1 wherein said cartridge of compressed gas contains a gas lighter-than-air.

4. A locator device according to claim 1 wherein said tether means has multiple tether lines affixed to said air-foil.

5. A locator device according to claim 4 wherein said tether means has two forward tether lines, two rearward tether lines and a rear center tether line attached to a main tether line.

6. A locator device according to claim 5 wherein said rearward and rear center tether lines are of elastic material.

7. A locator device according to claim 5 wherein said two forward tether lines are attached to said main tether line at a point forward of the center of said airfoil.

8. A locator device according to claim 1 wherein said tail means is composed of a metalized polymer.

9. A locator device according to claim 8 wherein said tail means comprises a multiplicity of hinges and a multiplicity of popouts for extending said tail in the form of a streamer and providing better microwave detectability.

* * * * *